United States Patent [19]

Long

[11] Patent Number: 4,630,113
[45] Date of Patent: Dec. 16, 1986

[54] BASEBAND CATV DECODER WITH STEREO BYPASS

[75] Inventor: Michael E. Long, Western Springs, Ill.

[73] Assignee: Zenith Electronics Corporation, Glenview, Ill.

[21] Appl. No.: 649,396

[22] Filed: Sep. 11, 1984

[51] Int. Cl.⁴ .......................... H04N 7/16; H04N 7/10
[52] U.S. Cl. ....................................... 358/121; 358/86
[58] Field of Search ................. 358/86, 114, 120, 121, 358/122, 123, 144, 197; 455/3, 4, 6

[56] References Cited

U.S. PATENT DOCUMENTS 4,398,216  8/1983  Field et al. .......................... 358/121

OTHER PUBLICATIONS

Ocker et al, "TV Multichannel Sound–Savior or Sacred Cow?", *IEEE Transactions on Consumer Electronics*, vol. CE-27, No. 3, Aug. 1981, pp. 361–365.

Eilers et al, "Television Multichannel Sound Broadcasting–A Proposal, *IEEE Transactions on Consumer Electronics*, vol. CE-27, No. 3, Aug. 1981, pp. 398–409.

Primary Examiner—Keith E. George

[57] ABSTRACT

A CATV decoder for receipt of television stereo audio includes a shunt path having a 4.5 MHz filter and amplifier for translating the 4.5 MHz audio signal to a modulator thus bypassing the normal audio baseband detector and 4.5 MHz oscillator circuit. A switch acts through an OR gate for selectively enabling the shunt path and normal audio path. Control from the cable head end is provided by a signal to the OR gate for returning operation to the normal audio path if reception is not authorized. In a similar manner, a remote audio mute signal may be supplied to the OR gate by the viewer.

8 Claims, 2 Drawing Figures

FIGURE 1

BASEBAND CATV DECODER WITH STEREO BYPASS

BACKGROUND OF THE INVENTION AND PRIOR ART

This invention relates generally to cable television systems and particularly to such systems for use in connection with stereo sound.

Cable television systems (CATV) are those in which a cable operator, for a fee, supplies a group of subscribers with a converter or decoder for receiving a plurality of television program channels. The term decoder will be used herein to refer to both converters and decoders. All available over-the air commercial television channels are frequency-converted by the operator and supplied to subscribers by cable along with a plurality of other channel signals. Some of the supplementary signals are specially scrambled and require a special decoder (and an additional fee) for viewing. The decoder is under the control of the operator from the so-called cable "head end" and channels may be authorized or nonauthorized by appropriate control signals imposed on the individual channel signal. Thus, the decoder in a viewer's home is, for some purposes, under control of the head end which minimizes its illegal usage as well as precludes reception of channels for which fees have not been received.

Many decoders offer remote control convenience for changing channels, controlling sound levels and muting sound. CATV systems have, in many instances, displaced the tuning and audio control functions of the television receiver to which the CATV decoder is linked since the decoder output is a modulated television signal on the frequency of either VHF channel 3 or 4. Thus the television receiver is "permanently" tuned to channel 3/4 and channel selection is performed at the decoder. Needless to say, remote control is a very desirable feature for viewers.

Recently, stereo sound has been made available for television programming. Television signals that carry stereo sound and also second audio programming (SAP) will do so with additional subcarriers on the 4.5 MHz audio carrier. As this new service grows in popularity, cable operators will want to offer television stereo and SAP to their subscribers. Many present converters have audio circuits that are incapable of properly translating such a stereo/SAP audio signal. Further, many converters detect the 4.5 MHz intercarrier audio signal to produce baseband audio for volume control and mute purposes. Consequently, there is a need in the art for a CATV decoder capable of translating television signals with stereo audio.

OBJECTS OF THE INVENTION

A principal object of this invention is to provide a novel CATV decoder system.

Another object of this invention is to provide a CATV decoder for translating both normal and stereo audio television signals.

A further object of this invention is to provide a CATV decoder capable of receiving television stereo audio signals, that is controllable by the cable operator.

SUMMARY OF THE INVENTION

In accordance with the invention, a CATV decoder includes a tuner for developing detected video and 4.5 MHz audio signals, decoder means for decoding the video, an audio path including audio detection means for producing baseband audio, oscillator means for regenerating the 4.5 MHz audio signal and a modulator for modulating a carrier with the decoded video and regenerated 4.5 MHz audio signal, a shunt path around the audio path for passing the 4.5 MHz audio signal directly to the modulator and means for selectively activating the shunt path and the audio path.

BRIEF DESCRIPTION OF THE DRAWINGS

These and other objects of the invention will become apparent upon reading the following description in conjunction with the drawings in which.

DESCRIPTION OF THE PREFERRED EMBODIMENT

Figure 1:
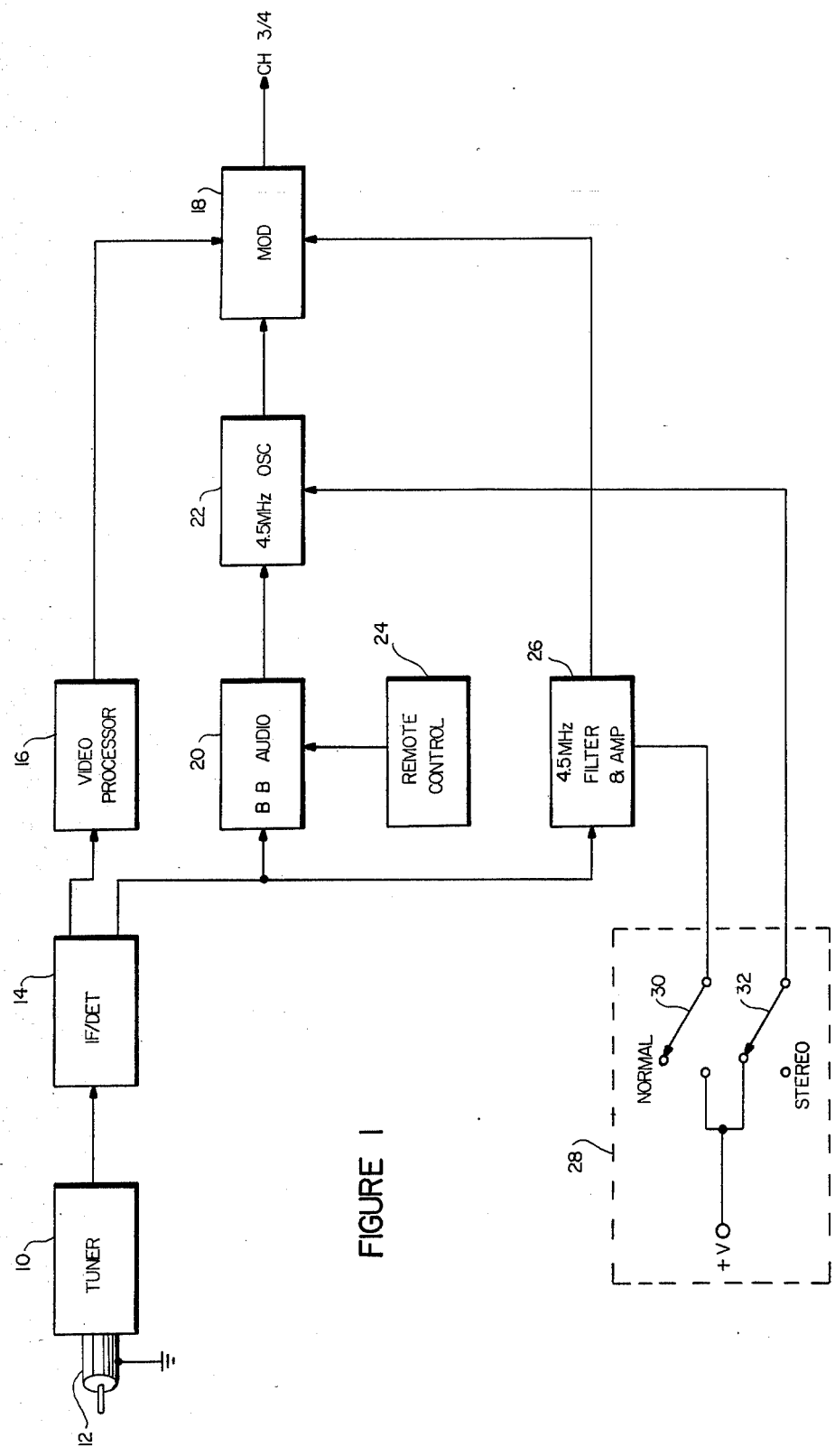
FIG. 1 is a partial block diagram of a CATV decoder incorporating the invention.

Referring to FIG. 1, a CATV decoder includes a tuner 10 which is supplied with appropriate television channel signals via a cable input 12 and which, in turn, selects one of the input signals and applies it to an IF/Detector 14, one output of which supplies a video signal to a video signal processor 16 and another output of which supplies a 4.5 MHz intercarrier audio signal. The output of video processor 16 is supplied to a modulator 18. The 4.5 MHz audio signal is fed to a baseband audio circuit 20 where the audio signal is detected and subjected to further processing before being used to modulate a 4.5 MHz oscillator 22 to regenerate a 4.5 MHz audio signal. The regenerated audio is also supplied to modulator 18.

The above described circuits are conventional. It will be understood by those skilled in the art that video processor 16 may include circuitry for decoding encoded or scrambled television signals and that audio circuit 20 may likewise include circuitry for enabling the head end to control operation of the audio circuit. A block labelled "Remote Control" is coupled to audio circuit 20 and should be understood to include suitable apparatus for controlling the volume level and the muting of the baseband audio signal developed in audio circuit 20. The output of modulator 18 is a carrier, generally at VHF channel 3 or 4 frequency, that is modulated with the decoded video signal from video processor 16 and the regenerated 4.5 MHz audio signal, the modulation of which may be modified by the remote control circuit. The VHF signal is supplied to the channel 3/4 input of a television receiver or video cassette recorder (neither being shown) for further processing.

As mentioned, the presence of a stereo audio or SAP signal in the output of IF/Detector 14 poses difficulties since the audio path, consisting of baseband audio circuit 20 and 4.5 MHz oscillator 22, is incapable without modification of properly translating the stereo signal and SAP signal.

The inventive circuitry includes a shunt path for supplying the 4.5 MHz audio signal from IF/Detector 14 directly to modulator 18. This path consists of a block 26 labelled "4.5 MHz Filter and Amplifier" and is, in essence, a bypass around the "normal" audio path comprising audio circuit 20 and oscillator 22. A control switch 28, which can be user-operated and head end operated, is provided in the decoder for selecting between the normal and stereo operating modes. Control switch 28, indicated in dashed lines, includes a pair of switch poles 30 and 32 movable between normal and stereo mode positions for alternatively connecting 4.5 MHz filter and amplifier 26 in the shunt path and oscillator 22 in the normal audio path to a source of +V voltage. Thus when switch 28 is in the normal mode position, +V energizing voltage is applied to oscillator 22 and 4.5 MHz filter and amplifier 26 is disabled. Conversely with switch 28 in the stereo mode position, 4.5 MHz filter and amplifier 26 is energized and oscillator 22 is disabled.

Providing switch 28 on the decoder thus enables the stereo audio signal modulated 4.5 MHz carrier in a telecast to be passed directly to modulator 18 for utilization by an appropriately equipped television receiver or video cassette recorder. However, in this mode there is no remote volume control or mute function available to the viewer, in so far as the decoder is concerned, since the audio in the decoder is not at baseband frequency. Of even more importance, the control that the head end as over the audio section of the decoder will be lost. Consequently, any control circuitry of the normal audio path is bypassed by activation of the shunt path. Thus, special pay programs may be listened to by "nonpaying subscribers" by simply placing switch 28 in the stereo mode position. Even though the video information might still be scrambled, a great deal of the benefits of some "specials", such as musical programs and sporting events, may be obtained by listening to the audio portion alone. Thus it is very desirable to be able to control the audio portion of the decoder from the head end.

Figure 2:
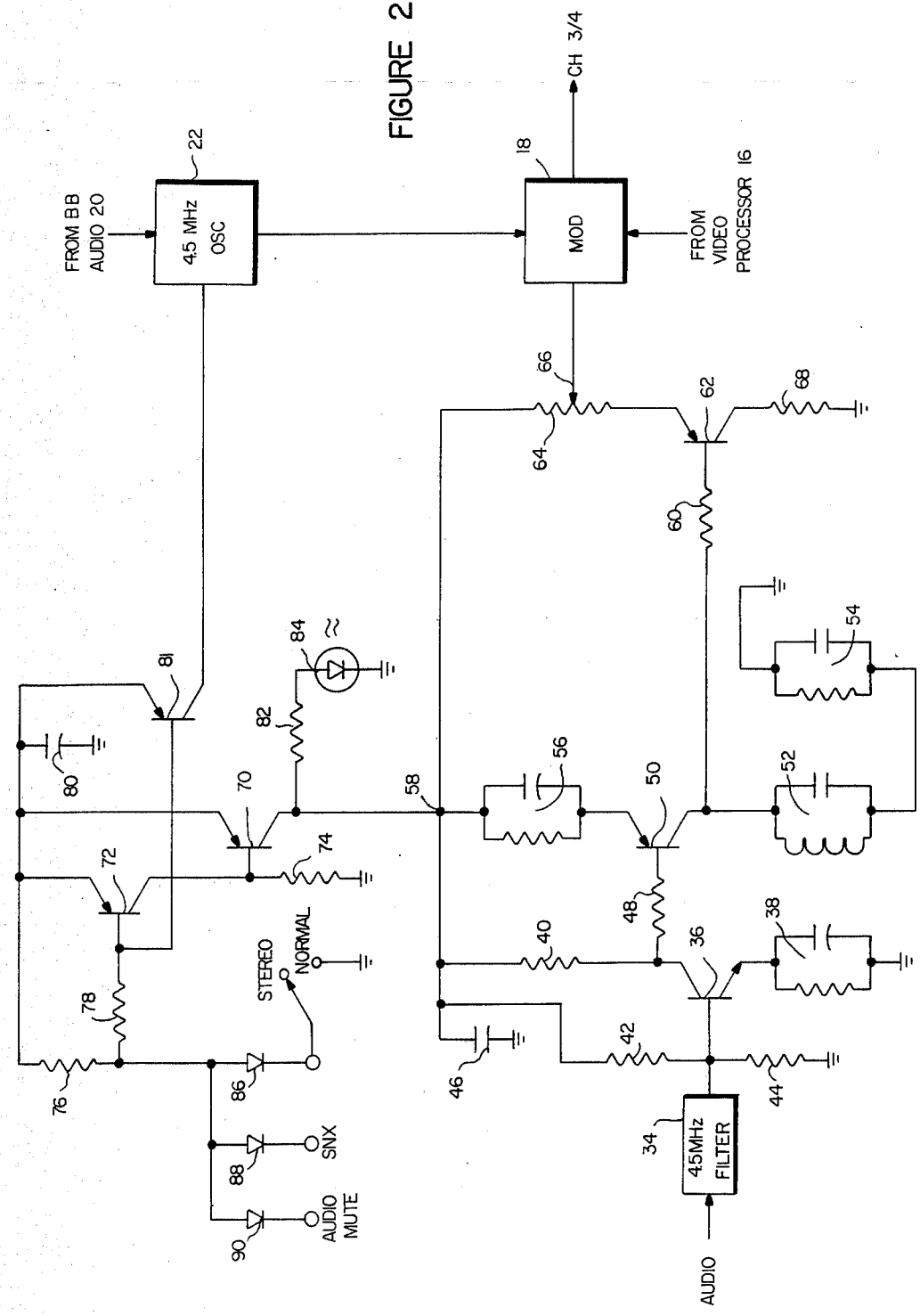
FIG. 2 is a partial schematic diagram of a portion of the block diagram of FIG. 1.

The partial schematic diagram of FIG. 2 provides for defeating the shunt path with a signal from the head end and also gives the user an audio mute control function when switch 28 is in the stereo mode position. 4.5 MHz audio information is supplied to a 4.5 MHz filter 34 in the shunt path. The filter output is supplied to the base of an NPN transistor 36, having its emitter coupled to ground through an RC bias network 38 and its collector connected, through a load resistor 40, to a junction 58. Bias for the transistor base is developed at the junction of resistors 42 and 44 serially connected between junction 58 and ground. Junction 58 is high frequency bypassed by a capacitor 46. The output of transistor 36 is taken from its collector, through a resistor 48 to the base of PNP transistor 50. The collector of transistor 50 is connected, through a tank circuit 52 and an RC bias network 54, to ground. Its emitter is connected through an RC bias network 56 to junction 58. The output of transistor 50 is taken from its collector through a resistor 60 to the base of a PNP transistor 62, having its collector connected to ground through a resistor 68 and its emitter connected to junction 58 through a potentiometer 64. A slider 66 on potentiometer 64 is connected to modulator 18. The circuit elements coupled between 4.5 MHz filter 34 and modulator 18 form a 4.5 MHz amplifier. When junction 58 is supplied with appropriate potential, the 4.5 MHz audio input is supplied through the 4.5 MHz filter 34 and the 4.5 MHz amplifier to modulator 18. The signal level supplied to the modulator is adjustable by movement of slider 66.

The potential at junction 58 is controlled by a switching circuit consisting of a PNP transistor 70 having its emitter connected to a +V voltage source and its collector connected to junction 58. Another PNP transistor 72 has its emitter connected to +V and its collector connected to the base of transistor 70 and, through a resistor 74, to ground. Bias for transistor 72 is provided by a pair of resistors 76 and 78 connected in series between +V and the base of transistor 72. The +V voltage is high frequency bypassed to ground through a filter capacitor 80. The junction of resistors 76 and 78 is connected to the anodes of a plurality of diodes 86, 88 and 90, the cathodes of which are respectively connected to terminals labelled "Stereo/Normal", "SNX" and "Audio Mute". The manual Stereo/Normal switch 28 has been discussed previously. The SNX (sound normal switch) signal, which is developed in the converter, goes low in response to a signal from the head end that indicates that the decoder has been authorized to receive sound on the particular channel. The SNX signal controls passage of the baseband audio signal to the 4.5 MHz oscillator in response to a control signal from the cable head end. The Audio Mute terminal is grounded in response to a mute remote control signal from the viewer. It is also momentarily grounded during a decoder channel change. This mute signal is normally available for controlling a mute function on the audio portion of the decoder audio.

The base of transistor 72 is connected to the base of a PNP switch transistor 81 having its emitter connected to +V and its collector connected to energize 4.5 MHz oscillator 22. The oscillator is shown with an input from baseband audio 20 in FIG. 1 and, in turn, supplies a signal to modulator 18. Modulator 18 also receives an input from video processor 16 and supplies an RF output on VHF channel 3/4.

The arrangement of diodes 86, 88 and 90 will be seen to comprise an OR gate for connecting the junction of resistors 76 and 78 to ground. Recalling that the circuit is a bypass, with switch 28 in the normal mode position, the cathode of diode 86 is connected to ground and transistor 72 is rendered conductive. In conducting, transistor 72 cuts off transistor 70, which removes +V potential from junction 58 and disables the 4.5 MHz amplifier, thus deactivating the shunt path to modulator 18. When transistor 72 conducts, its base electrode potential forces switch transistor 81 to conduct, which turns on 4.5 MHz oscillator 22 to enable the normal audio path to modulator 18. Consequently, in the normal mode the audio path of the decoder is enabled and the shunt path is disabled. It will be recalled that with the normal audio path enabled, control of the audio circuit is available to the head end by well known means (not shown) through the SNX signal.

With switch 28 in the stereo mode position, and assuming an absence of any grounding signals at the Audio Mute and SNX terminals, the bias for transistor 72 is removed and transistor 72 becomes nonconductive. Its base potential rises to almost +V potential and cuts off switch transistor 81, which disables 4.5 MHz oscillator 22. When transistor 72 is nonconductive, transistor 70 is forward biased into conduction and places junction 58 at substantially +V potential which energizes the 4.5 MHz amplifier in the shunt path. Specifically, transistors 36, 50 and 62 are all driven conductive and amplify the 4.5 MHz audio signal supplied to modulator 18. A stereo mode indicator is provided by a resistor 82 and a light emitting diode (LED) 84 coupled between the collector of transistor 70 and ground. When transistor 70 conducts, LED 84 is illuminated to indicate the stereo mode.

Should the head end wish to disable audio on the particular channel because the decoder is unauthorized for any reason, an appropriate signal for grounding the SNX terminal is sent. In that event, the ground at the cathode of diode 88 activates transistor 72 which enables 4.5 MHz oscillator 22 and disables the shunt path, even though the decoder is being operated in the stereo mode. Thus the normal audio, which is muted for an unauthorized decoder, is available because the normal audio path is enabled and the shunt path disabled. Consequently, the cable operator retains control of the audio accompanyment of premium channels despite the shunt arrangement for stereo sound.

In a similar manner, an audio mute function is provided for the viewer who already has the capability of controlling baseband audio remotely. Means (not shown) are provided for supplying a ground to the cathode of diode 90 when the decoder is being operated in the stereo mode and the audio mute remote control function is activated. The ground at diode 90 is equivalent to an SNX signal being received or to switch 28 being in the normal mode position. All deactivate the shunt path and enable oscillator 22, thus enabling the normal audio path and rendering the normal baseband audio control functions effective to mute the baseband audio signal. Consequently, a mute control function over the volume is provided to the user.

It will thus be seen that the invention provides a simple economical solution to processing both stereo audio and normal audio in a decoder while retaining authorization control of the audio from the head end. Further, those decoders equipped with remote control audio can retain the audio mute function.

It is recognized that numerous modifications and changes in the described embodiment of the invention will be apparent to those skilled in the art without departing from the true spirit and scope thereof. The invention is to be limited only as defined in the claims.

What is claimed is:

1. A CATV decoder of the type including a tuner for developing a video signal and a continuous 4.5 MHz audio signal, a video processor for decoding the video signal, an audio path having an audio detector for producing baseband audio, an oscillator regenerating the continuous 4.5 MHz audio signal and a modulator for modulating the decoded video signal and regenerated 4.5 MHz audio signal onto a carrier, the improvement comprising:

a shunt path around said audio path for passing said continuous 4.5 MHz audio signal directly to the modulator; and
   means for selectively activating said shunt path and said audio path.

2. The decoder of claim 1 wherein signal translation in said audio path is normally controllable by a control signal and further including:
   control means for controlling said shunt path responsive to a control signal.

3. The decoder of claim 2 wherein said shunt path includes an amplifier that is activated in response to said control signal.

4. The decoder of claim 3 wherein said control signal is under control of a user.

5. A CATV decoder comprising:
   means for receiving television signals and for providing a decoded video signal and a continuous 4.5 MHz audio signal;
   a modulator for producing a modulated carrier at a VHF channel frequency;
   means for supplying said decoded video signal to said modulator;
   an audio path including an audio detector and a 4.5 MHz oscillator for translating said continuous 4.5 MHz audio signal and supplying it to said modulator;
   a shunt path for translating said continuous 4.5 MHz audio signal to said modulator around said audio path; and
   means for selectively enabling said audio path and said shunt path.

6. The decoder of claim 5 wherein said continuous 4.5 MHz audio signal includes a stereo audio signal having an extended frequency range, said shunt path including 4.5 MHz filter means and 4.5 MHz amplifier means for receiving and amplifying said continuous 4.5 MHz audio signal.

7. The decoder of claim 6 further including switch means for controlling selective activation of said 4.5 MHz oscillator in said audio path and said 4.5 MHz amplifier means in said shunt path; and
   means for controlling energization of said switch means from a plurality of inputs.

8. The decoder of claim 7 wherein said plurality of inputs comprise a switch on said decoder, a control signal input, and a mute signal from a viewer.

* * * * *